(12) United States Patent
Castillo et al.

(10) Patent No.: US 10,518,812 B2
(45) Date of Patent: Dec. 31, 2019

(54) BODY MOUNTING SYSTEM FOR AN EXOSKELETON VEHICLE

(71) Applicant: GM Global Technology Operations LLC, Detroit, MI (US)

(72) Inventors: Brian V. Castillo, Birmingham, MI (US); Giles D. Bryer, Northville, MI (US); John Gibson, Highland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 207 days.

(21) Appl. No.: 15/362,142

(22) Filed: Nov. 28, 2016

(65) Prior Publication Data

US 2018/0148103 A1 May 31, 2018

(51) Int. Cl.
*B62D 24/02* (2006.01)
*B62D 23/00* (2006.01)

(52) U.S. Cl.
CPC ........... *B62D 24/02* (2013.01); *B62D 23/005* (2013.01); *B60Y 2400/48* (2013.01)

(58) Field of Classification Search
CPC ...... B62D 24/02; B62D 23/005; B62D 24/00; B62D 24/04; B62D 33/077; B60Y 2400/48
USPC ...................................................... 296/35.1
See application file for complete search history.

(56) References Cited

U.S. PATENT DOCUMENTS

| | | | | |
|---|---|---|---|---|
| 3,881,767 A | * | 5/1975 | Klees | B60G 99/004 296/35.2 |
| 4,799,708 A | | 1/1989 | Handa et al. | |
| 4,817,985 A | | 4/1989 | Enokimoto et al. | |
| 5,401,056 A | * | 3/1995 | Eastman | B60G 3/20 296/193.03 |
| 6,494,525 B1 | * | 12/2002 | Blank | B62D 21/157 296/187.02 |
| 6,533,348 B1 | | 3/2003 | Jaekel et al. | |
| 7,213,869 B1 | * | 5/2007 | McClellan | E04H 12/2238 296/163 |
| 7,267,394 B1 | | 9/2007 | Mouch et al. | |
| 8,955,632 B2 | | 2/2015 | Schurna et al. | |

FOREIGN PATENT DOCUMENTS

DE 102011004382 A1 4/2012

OTHER PUBLICATIONS

Office Action issued for Chinese counter-part Patent Application 201711169606.8; Report dated Oct. 8, 2019 (pp. 1-8).

* cited by examiner

*Primary Examiner* — Stephen T Gordon
(74) *Attorney, Agent, or Firm* — Cantor Colburn LLP

(57) ABSTRACT

A vehicle includes a frame assembly, a body, and a first strip isolator disposed between the body and the frame.

7 Claims, 3 Drawing Sheets

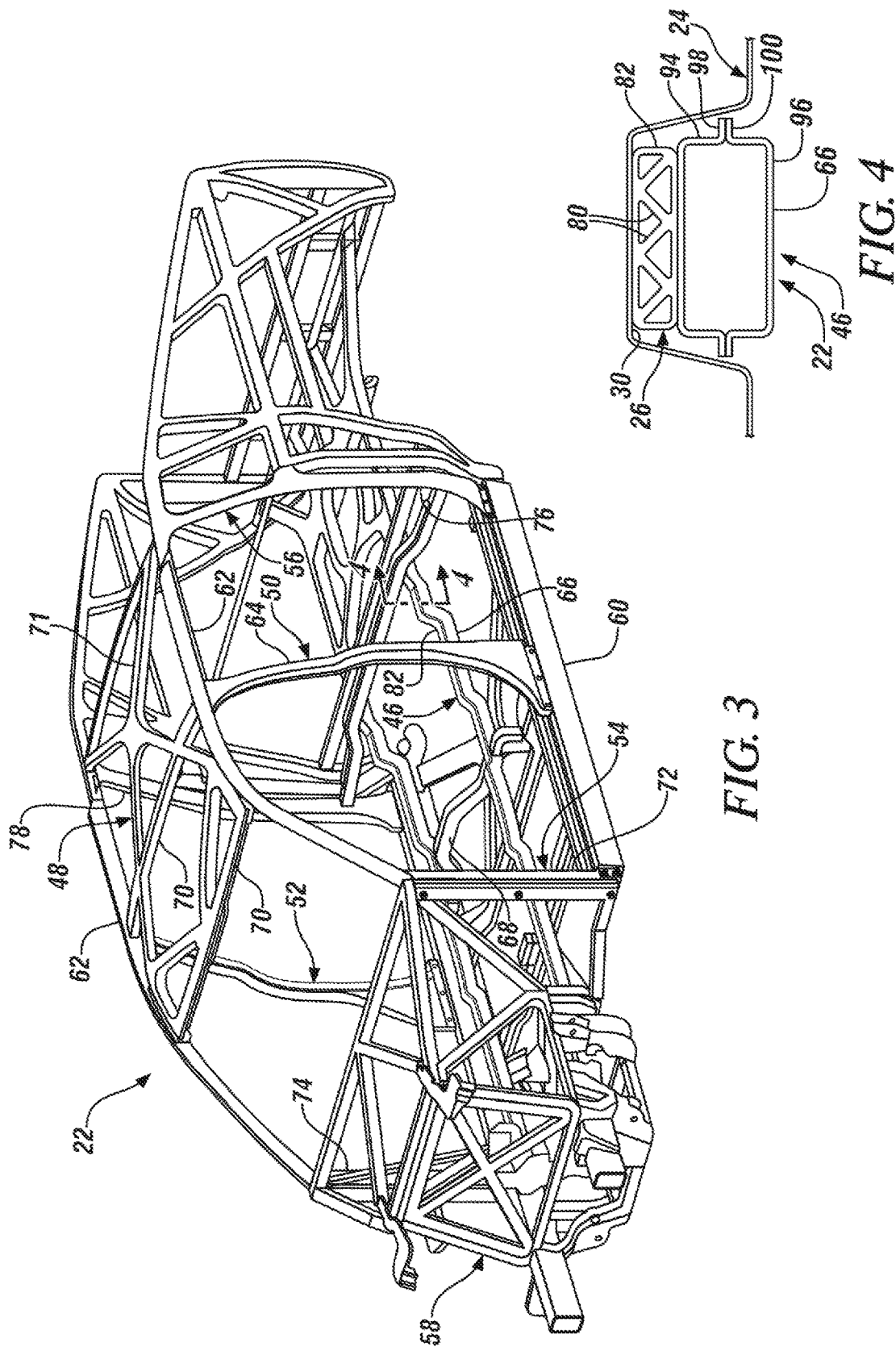

BODY MOUNTING SYSTEM FOR AN EXOSKELETON VEHICLE

INTRODUCTION

The subject invention relates to exoskeleton vehicles, and more particularly, to a body mounting system for an exoskeleton vehicle.

Traditional vehicles include a support structure or chassis frame that typically supports body components of the vehicle from below. One example of such a body component may be a cab of a pickup truck. In this example, point load isolators are generally mounted between a ladder frame and the cab that is generally positioned above the ladder frame. The point load isolators are typically designed to secure the cab to the ladder frame in all directions. That is, the point load isolator may restrict movement of the cab with respect to the ladder frame in any direction that may include a vertical direction, forward and aft directions, and a side-to-side direction. Unfortunately, traditional ladder frames may be heavy in order to provide the desired strength and stiffness. Moreover, the point load isolators may not distribute loads well and may be heavier than desired in order to meet design criteria, and may require many parts including threaded fasteners that contribute toward manufacturing cost.

SUMMARY

In one exemplary embodiment of the present disclosure, a vehicle includes a frame assembly, a body, and a first strip isolator disposed between the body and the frame.

In another embodiment, an exoskeleton vehicle includes a body, a frame assembly and a multi-sided mounting system. The body includes an external surface and an opposite internal surface defining an occupant compartment. The frame assembly is disposed adjacent to the external surface, and the multi-sided mounting system is disposed between, and constructed and arranged to contact, the frame assembly and the body.

The above features and advantages and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 3 is a perspective view of a frame assembly of the exoskeleton vehicle; and FIG. 4 is a cross section of a strip isolator positioned between a body and the frame assembly of the exoskeleton vehicle generally taken along line 4-4 of FIG. 3 and with a portion of a body of the vehicle added.

DETAILED DESCRIPTION

Figure 1:
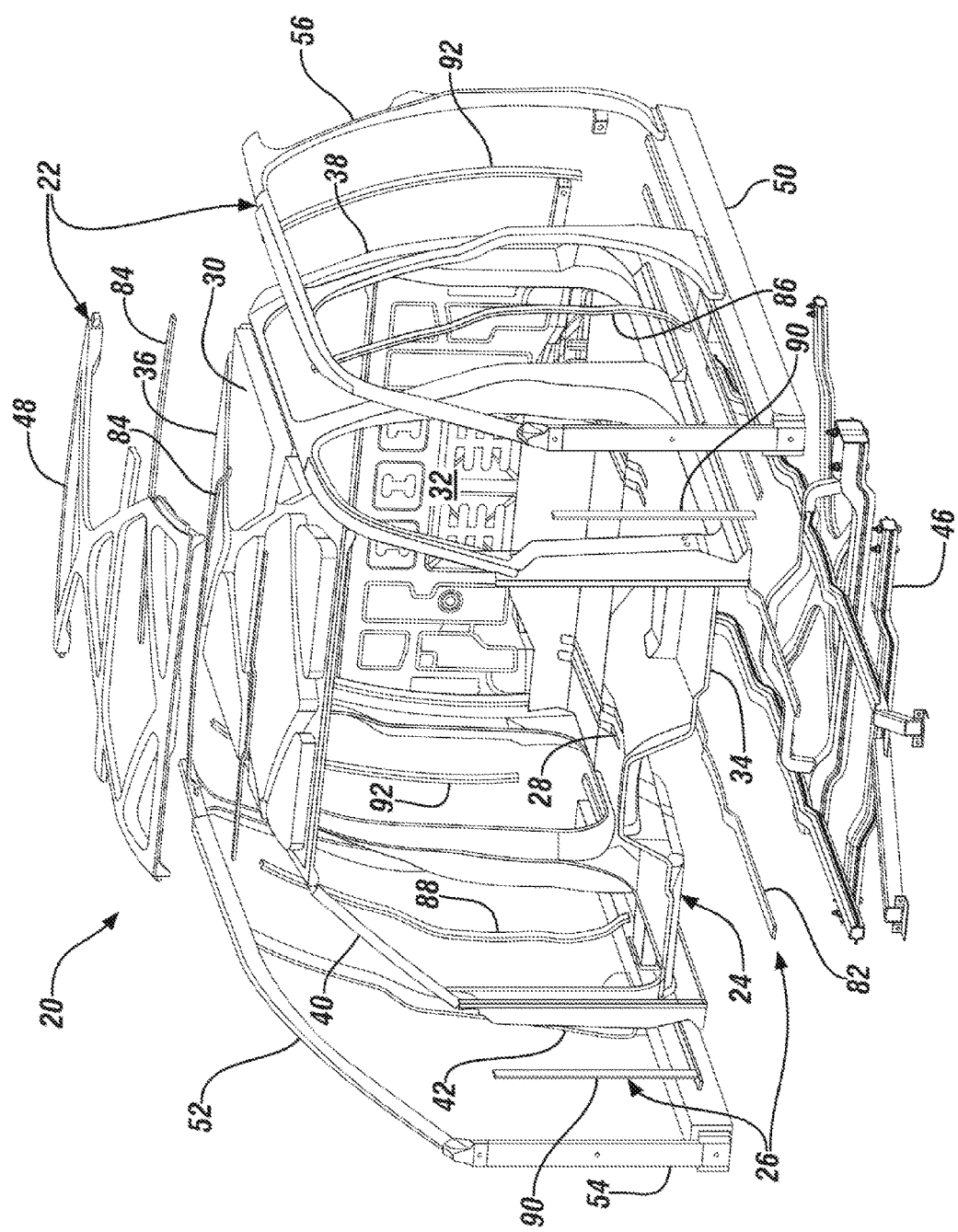
FIG. 1 is a disassembled perspective view of an exoskeleton vehicle with portions removed to show internal detail, and as one, non-limiting, exemplary embodiment in accordance with the present disclosure.

The following description is merely exemplary in nature and is not intended to limit the present disclosure, its application or uses. It should be understood that throughout the drawings, corresponding reference numerals indicate like or corresponding parts and features.

Figure 2:
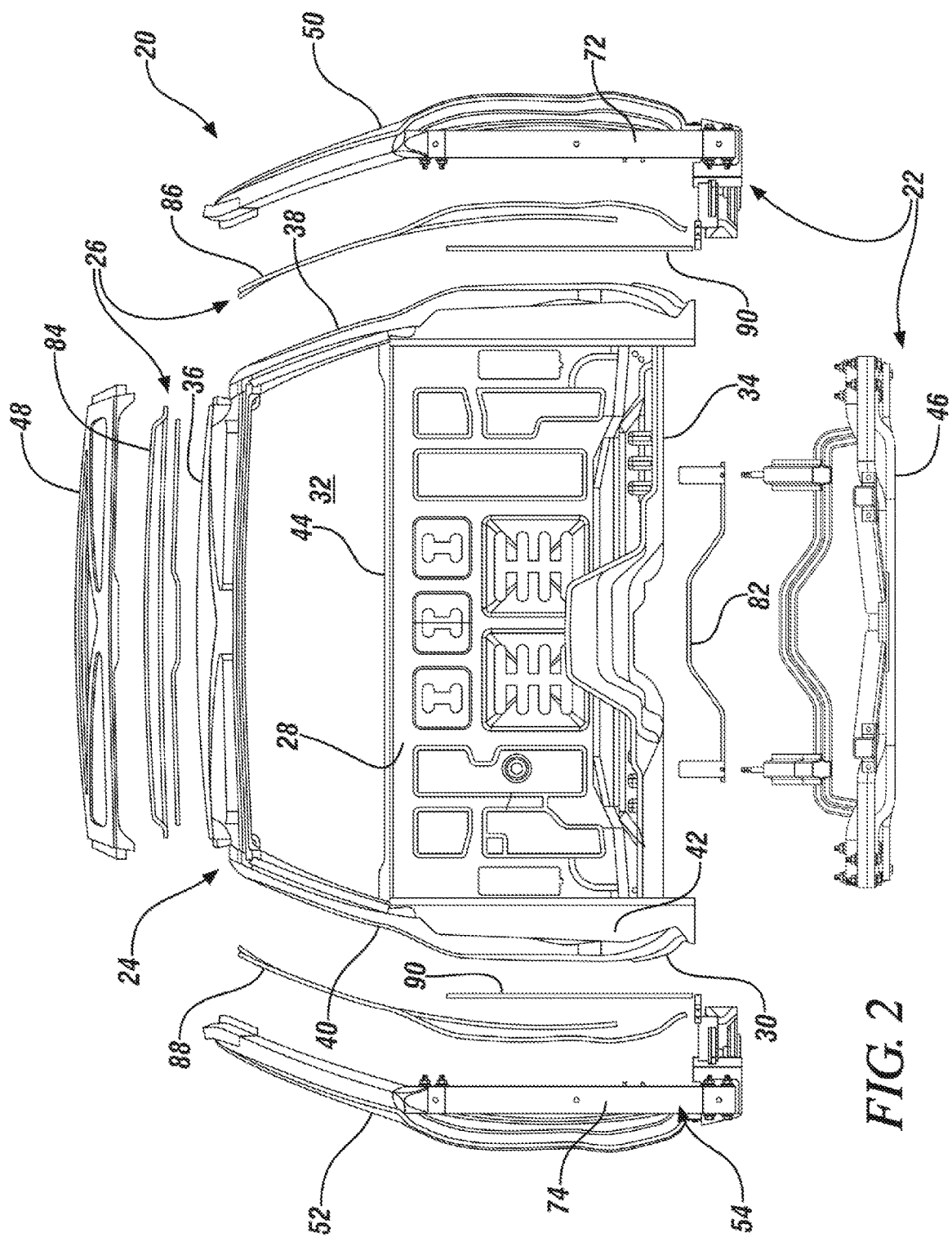
FIG. 2 is a disassembled front view of the exoskeleton vehicle with portion removed to show internal detail.

In accordance with an exemplary embodiment of the invention, FIGS. 1 and 2 illustrate a vehicle 20 that may be an exoskeleton vehicle. The vehicle 20 may include a frame assembly 22, a body 24, and a mounting system 26 that may be multi-sided. The body 24 includes an internal surface 28 and an opposite external surface 30. The internal surface 28 may define the boundaries of a compartment 32, which may be a cab compartment that receives the vehicle operator, passengers, and/or cargo. The external surface 30 generally opposes the frame assembly 22, and the mounting system 26 is generally located between the external surface 30 and the frame assembly 22. As one, non-limiting, example, the vehicle 20 is illustrated as a pickup truck; however, other examples of a vehicle may include a sport utility vehicle, a sedan, and other types.

The body 24 may include a bottom portion 34, a top portion 36, opposite side portions 38, 40, a forward portion 42, and a rearward portion 44. Together, the portions 34, 36, 38, 40, 42, 44 may each carry respective segments of the internal surface 28, which when combined, define the boundaries of the compartment 32. It is further contemplated and understood, that the body 24 may include other portions depending upon the type of vehicle 20. For example, if the vehicle 20 is a pickup truck, the body 24 may include a cab section and a truck bed section, which may, or may not, be independent of the cab section. Each section may include any number of the body portions described above.

Referring to FIGS. 1 through 3, the frame assembly 22 may be, in whole or in part, an exoskeleton frame assembly that may further be a tubular frame assembly. The frame assembly 22 may include a bottom frame 46, a top frame 48, opposite side frames 50, 52, a forward frame 54 and a rearward frame 56. The bottom and top frames 46, 48 may be spaced vertically from one another, and may each lie within a substantially horizontal plane. The side frames 50, 52 may be spaced horizontally from one-another, may generally span vertically between the bottom and top frames 46, 48, and may further span in forward and rearward directions with respect to the vehicle 20. The forward and rearward frames 54, 56 may be spaced horizontally from one-another, may generally span vertically between the bottom and top frames 46, 48, and may span horizontally between the side frames 50, 52.

Referring to FIG. 3, the frame assembly 22 may further include an engine frame or cage 58 that may generally surround and support an engine. The engine frame 58 may fasten to the forward frame 54. Each side frame 50, 52 may include bottom and top longitudinal members 60, 62 vertically spaced apart from one-another and connected by at least one cross member 64 that may extend vertically. The bottom frame 46 may be a lattice structure, and may include a longitudinal member 66, at least one cross member 68 and other lattice members that may generally connect to and/or intersect the longitudinal member 66. Similarly, the top frame 48 may be a lattice structure, and may include cross members 70 each spanning between, and connecting to, the top longitudinal members 62 of the respective side frames 50, 52. The top frame 48 may include other lattice members 71 that may generally cross one-another and connect to the cross members 70 and/or connect to longitudinal members 62.

The forward frame 54 of the frame assembly 22 may be part of the engine frame 58. Alternatively, the forward frame 54 may include vertical members 72, 74 each spanning substantially vertically between, and connecting to, bottom and top longitudinal members 60, 62 of the respective side frames 50, 52. The engine frame 58 may connect to the vertical members 72, 74. It is further contemplated and understood that the forward frame 54 may include cross members spanning between the vertical members 72, 74, and/or the engine frame 58 may include any number of cross members to further strengthen and connect to the vertical members 72, 74.

The rearward frame 56 may include vertical members 76, 78 each spanning substantially vertically between, and connecting to, bottom and top longitudinal members 60, 62 of the respective side frames 50, 52. It is further contemplated and understood that the rearward frame 56 may include cross members spanning between the vertical members 76, 78 to further connect to and strengthen the vertical members 76, 78.

Referring to FIGS. 1 through 4, the multi-sided mounting system 26 may be, or may include, a plurality of isolators that may be strip isolators. The mounting system 26 may be engaged to the frame assembly 22, may be in direct contact with the external surface 30 of the body 24, and may be resiliently compressed between the external surface 30 and the frame assembly 22. Each mounting system 26 may be made of a polymer material that may be extruded. The mounting system or strip isolator 26 may be generally hollow with an array of internal stanchions 80 positioned to meet design load demands while maintaining desired isolation compliance and/or dampen vibration. It is contemplated and understood that alternative embodiments of the mounting system 26 may be include resilient pucks, or other mounting devices that may be capable of distributing load and providing a degree of vibration dampening.

The mounting system 26 may include at least one bottom isolator 82 (see FIGS. 1, 3 and 4), a top isolator 84 (see FIG. 1) that generally opposes the bottom isolator 82, opposing side isolators 86, 88, at least one forward isolator 90 (i.e., two illustrated in FIG. 1), and at least one rearward isolator 92 (i.e., two illustrated in FIG. 1) that may oppose the forward isolator(s) 90. When fully assembled, the bottom isolator 82 may be engaged to the bottom frame 46 and resiliently compressed against the external surface 30 carried by the bottom portion 34 of the body 24. The top isolator 84 may be engaged to the top frame 48 and resiliently compressed against the external surface 30 carried by the top portion 36 of the body 24. The side isolators 86, 88 may be engaged to respective side frames 50, 52 and resiliently compressed against the external surface 30 carried by the respective side portions 38, 40 of the body 24. The forward and rearward isolators 90, 92 may be engaged to the respective forward and rearward frames 54, 56 and resiliently compressed against the external surface 30 carried by the respective forward and rearward portions 42, 44 of the body 24. In one embodiment, and when fully assembled as described above, the mounting system 26 may be a six-sided mounting system.

During assembly of the vehicle 24, the various frames 46, 48, 50, 52, 54, 56 of the frame assembly 22 may be modules that are fastened together about the pre-formed body 24. The frame assembly 22 may function as the primary support structure for the vehicle 20, and because it is exoskeletal in design, may be visually prominent when viewing the vehicle. In general, and unlike more traditional designs where the frame is located beneath a body, the frame assembly 22 of the present disclosure generally surrounds the body 24. The exoskeleton frame assembly 22 may be stronger, stiffer, and lighter, by orders of magnitude, than more traditional chassis frame designs. More specifically and in the vehicle example of a pickup truck, traditional chassis frame designs may include a ladder frame positioned horizontally with a cab body and truck bed resting vertically upon and above the ladder frame. In the present disclosure, the side frames 50, 52 are generally positioned vertically with the longitudinal members 60, 62 vertically spaced apart thus resisting chassis frame flexing appreciably better than the more traditional rocker panel.

Referring further to FIG. 4, the bottom frame 46 is illustrated; however, similar cross sections may be taken anywhere about the vehicle 20 to illustrate how the mounting system 26 interfaces with the body 24 and the frame assembly 22. The tubular design of the longitudinal member 66 of the bottom frame 46 may be manufactured via a stamping process to assist in mass production and reducing cost. More specifically, the longitudinal member 66 or the bottom frame 46 as a whole may be stamped as two separate halves 94, 96 with each half having respective mating flanges 98, 100 that may be, for example, spot welded together. In other examples and where the frame assembly 22 may be more visible, the halves 94, 96 may be, for example, laser welded along a generally smooth seam. It is further contemplated and understood that the tubular design may be made of a composite or polymer material.

Advantages and benefits of the present disclosure include a vehicle frame offering load management, strength, stiffness, and suspension packaging features. Other benefits include low mass, and the ability to integrate a runningboard functionality into the chassis structure or frame assembly.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exoskeleton vehicle comprising:
   a body including an external surface and an opposite internal surface defining an occupant compartment;
   a frame assembly disposed adjacent to the external surface, wherein the frame assembly includes a top frame, a bottom frame, a first side frame and an opposite second side frame; and
   a multi-sided mounting system disposed between, and constructed and arranged to contact, the frame assembly and the body, wherein the multi-sided mounting system includes a bottom isolator disposed between the bottom frame and the external surface of the body, a top isolator disposed between the top frame and the external surface of the body, a first side isolator disposed between the first side frame and the external surface of the body, and a second side isolator disposed between the second side frame and the external surface of the body.

2. The exoskeleton vehicle set forth in claim 1, wherein the multi-sided mounting system is generally disposed at six sides of the exoskeleton vehicle.

3. The exoskeleton vehicle set forth in claim 1, wherein the frame assembly is a tubular frame assembly.

4. The exoskeleton vehicle set forth in claim 1, wherein the frame assembly includes a forward frame and an opposite rearward frame, and wherein the multi-sided mounting system includes a forward isolator disposed between the forward frame and the external surface of the body, and a rearward isolator disposed between the rearward frame and the external surface of the body.

5. The exoskeleton vehicle set forth in claim 1, wherein each of the bottom isolator, top isolator, first side isolator, and second side isolator is extruded.

6. The exoskeleton vehicle set forth in claim 1, wherein each of the bottom isolator, top isolator, first side isolator, and second side isolator is made of a polymer.

7. The exoskeleton vehicle set forth in claim 6, wherein each of the bottom isolator, top isolator, first side isolator, and second side isolator is compressed between the frame assembly and the external surface.

\* \* \* \* \*